United States Patent
Büschelberger et al.

(10) Patent No.: US 6,231,245 B1
(45) Date of Patent: May 15, 2001

(54) CONNECTION BETWEEN A LIGHT GUIDE AND A LIGHT RECEIVER

(75) Inventors: Hanns J. Büschelberger, Kirchzarten; Antonio Pla' Ibanez, Merzhausen, both of (DE)

(73) Assignee: Litef GmbH (DE)

( * ) Notice: Subject to any disclaimer, the term of this patent is extended or adjusted under 35 U.S.C. 154(b) by 0 days.

(21) Appl. No.: 09/402,184

(22) PCT Filed: Jan. 7, 1999

(86) PCT No.: PCT/EP99/00059

§ 371 Date: Sep. 28, 1999

§ 102(e) Date: Sep. 28, 1999

(87) PCT Pub. No.: WO99/39230

PCT Pub. Date: Aug. 5, 1999

(30) Foreign Application Priority Data

Jan. 28, 1998 (DE) .............................................. 198 03 225

(51) Int. Cl.[7] ........................................................ G02B 6/36
(52) U.S. Cl. ................................. 385/88; 385/89; 385/90
(58) Field of Search .................................. 385/88, 89, 90, 385/92, 94, 98, 99, 31, 14, 15

(56) References Cited

U.S. PATENT DOCUMENTS

| | | | |
|---|---|---|---|
| 4,185,740 | * 1/1980 | d'Auria et al. | 385/14 |
| 4,329,190 | 5/1982 | Berg et al. | 156/60 |
| 4,709,979 | 12/1987 | Spodati et al. | 385/14 |
| 5,400,419 | * 3/1995 | Heinen | 385/14 |
| 5,469,277 | * 11/1995 | Kavehrad et al. | 359/15 |
| 5,715,338 | * 2/1998 | Sjolinder et al. | 385/14 |

FOREIGN PATENT DOCUMENTS

| | | |
|---|---|---|
| 0009330 | 4/1980 | (EP) . |
| 0010352 | 4/1980 | (EP) . |
| 1304428 | 1/1973 | (GB) . |
| 56-046573 | 4/1981 | (JP) . |
| 56-079468 | 6/1981 | (JP) . |
| 60-156023 | 8/1985 | (JP) . |

\* cited by examiner

*Primary Examiner*—Mohammad Sikder
(74) *Attorney, Agent, or Firm*—Elliot N. Kramsky

(57) ABSTRACT

A connection between an optical waveguide and an encapsulated optical receiver having a window. An encapsulation-end end element of the waveguide is introduced into a capillary-like collar secured on top of the window which is provided in the encapsulation. The end element is bonded in the collar, which is surrounded by an anti-kink protective sleeve that overlaps the edge of the encapsulation and is preferably composed of one piece of a shrink-fit hose. The sleeve is filled on the inside with a sealing compound in the vicinity of the collar. The resulting connection is particularly resistant and insensitive to changes in temperature, moisture, vibration and shock.

7 Claims, 1 Drawing Sheet

CONNECTION BETWEEN A LIGHT GUIDE AND A LIGHT RECEIVER

BACKGROUND

1. Field of the Invention

The present invention relates to optical receivers. More particularly, this invention pertains to an interconnection between an optical waveguide and an optical receiver.

2. Description of Prior Art

Optical receivers, such as those employed in fiber optic systems, are generally encapsulated within cylindrical metal casings. The light-sensitive converter face is located at the smallest possible distance behind a glass window in the top of the metal casing. In the simplest case, the end of the optical waveguide is fitted in a butt-jointed fashion onto the window face of the detector casing and bonded thereto. In more complex structures, provision is made to guide the optical waveguide into the interior of the detector casing. The bushing of the casing must be sealed by a technically-relatively difficult bonding or soldering technique.

Figure 2:
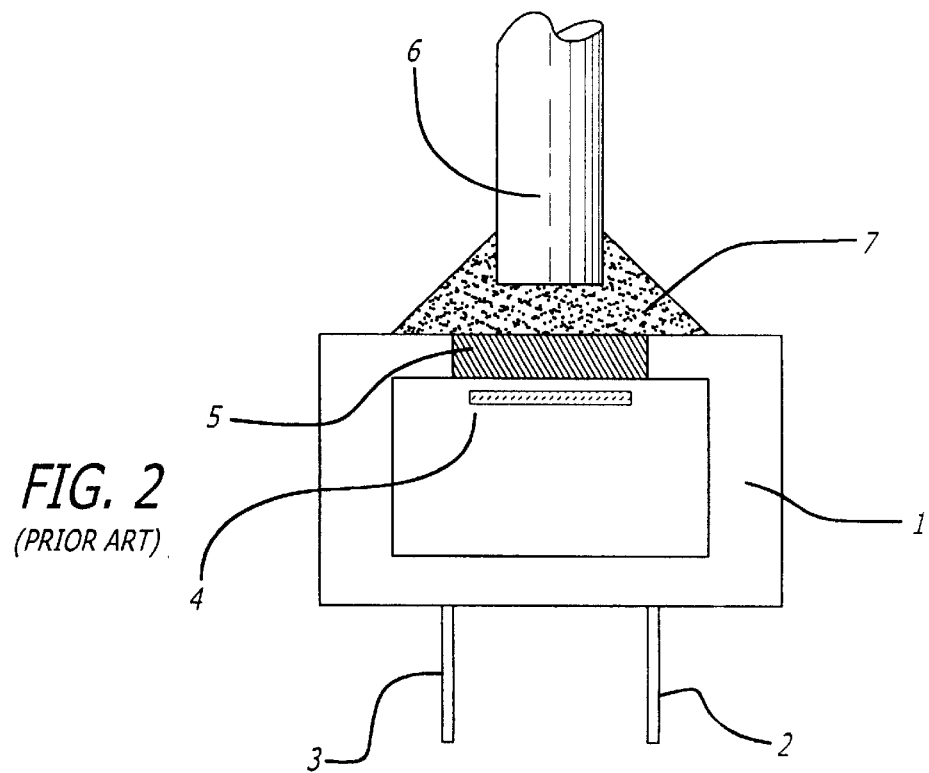

FIG. 2 is a side sectional view of such an optical waveguide connection in accordance with the prior art. A planar, light-sensitive converter 4 is located behind a translucent window 5 in an encapsulation 1 having electrical terminals 2 and 3. The end of the optical waveguide 6 is attached in front of the window 5 by means of a bonding agent 7.

In many fiber optic systems, the light radiation guided in optical waveguides must be fed to the optoelectric converter with as little loss as possible to permit evaluation of information coded onto the light. In such cases, a stable connection must be provided between the optical waveguide and the receiver. The coupling between the optical waveguide and the receiver (i.e. the converter) should not change (or change as little as possible) in response to varying environmental influences.

Simple bonding of the optical waveguide 6 to the glass window 5 of the detector encapsulation 1 (as explained with reference to FIG. 2) experiences inadequate stability. When the flexible optical waveguide 6 is bent, the connection is easily damaged. Alignment of light emerging from the optical waveguide accompanied by bending can change in such a way that part of the light intensity no longer strikes the light-sensitive surface of the converter 4. On the other hand, an embodiment with a casing bushing requires a special component structure comprising converter and casing. In many cases, standard detectors cannot be used in cylindrical casings with a glass window.

SUMMARY AND OBJECTS OF THE INVENTION

It is therefore an object of the present invention to provide a mechanically secure and electrically stable connection between an optical waveguide and an optoelectric converter.

It is a further object of the invention to provide a connection that can be implemented cost-effectively with commercially available parts.

The invention addresses the preceding and other objects by providing an improvement in a connection between an optical waveguide and an optical receiver. The receiver is of the type that includes an encapsulated light-sensitive converter located behind a translucent window. One end of the optical waveguide is secured in front of and permanently connected to the window of the encapsulation. The improvement includes an encapsulation-end end element of the waveguide. Such element is introduced into a capillary-like collar that is secured to a surface of the window. The end element is bonded within the collar. The collar is surrounded by an anti-kink protective sleeve that overlaps a window-end edge of the encapsulation. The interior of the protective sleeve is filled with a sealing compound in the region of the optical waveguide connection that is surrounded by the collar.

The preceding and other features and advantages of the invention will become further apparent from the detailed description that follows. Such description is accompanied by a set of drawing figures. Numerals of the drawing figures correspond to those of the written description with like numerals referring to like features throughout.

BRIEF DESCRIPTION OF THE DRAWING FIGURES

Figure 1:
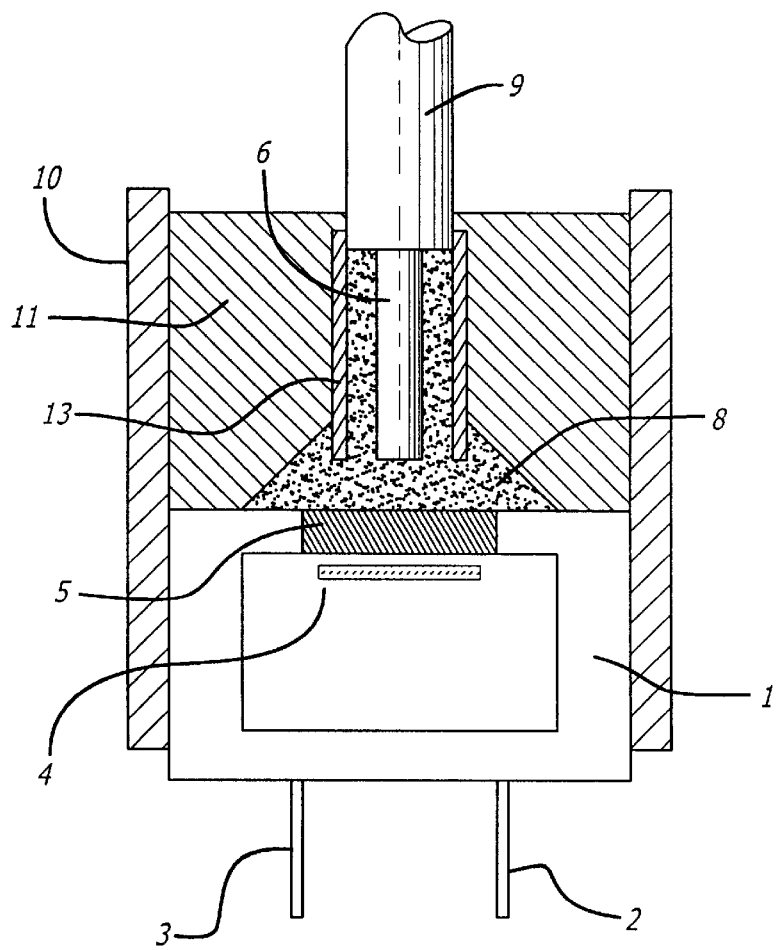

FIG. 1 is a cross-sectional view illustrating the elements of an optical waveguide connection for an optical waveguide in accordance with the invention; and FIG. 2 is a cross-sectional view illustrating the elements of an optical waveguide connection for an optical review in accordance with the prior art.

DETAILED DESCRIPTION OF THE PREFERRED EMBODIMENT

FIG. 1 is a cross-sectional view illustrating the elements of an optical waveguide connection for an optical receiver in accordance with the invention. Elements common to those illustrated with reference to the prior art apparatus of FIG. 2 are assigned like numerals.

An encapsulation 1 with electrical connections 2 and 3 contains a light-sensitive converter 4 whose light-sensitive converter face is oriented toward a translucent window 5. The optical waveguide 6 is introduced into a capillary-like collar 13 outside the window 5 and attached by means of a bonding agent 8. In the instance of a sheathed optical waveguide fiber, the sheath 9 is removed from the optical waveguide 6 in the vicinity of the collar 13. An anti-kink protective sleeve 10 at least partially surrounds the encapsulation 1. The space intermediate the collar 7 and the anti-kink protective sleeve 10 is filled with a sealing compound 11. The anti-kink protective sleeve 10, preferably composed of one piece of a shrink-fit hose, is secured on or to the encapsulation 1 by thermal contraction.

It is particularly cost-effective to produce the anti-kink protective sleeve 10 that surrounds the connection region from a single piece of shrinkable hose secured to the encapsulation 1, in the overlapping region, by thermal contraction.

The shape of the casing of the encapsulation 1 (having a glass window 5 and containing the light-sensitive converter face 4) need not necessarily be cylindrical. The end of the optical waveguide to be secured is embedded in a piece of a capillary, (i.e. the capillary-like collar 13). Such collar 13 is preferably composed of material of thermal expansion characteristic similar to that of the optical waveguide. As a rule, optical waveguide fibers, preferably composed of quartz glass or plastic and surrounded with a sheath of plastic material, are employed as optical waveguides. The sheath should be removed in the end region introduced into the capillary-like collar 13.

The optical waveguide is attached to the collar 13 by means of bonding agent. The bonding of the optical waveguide to the collar 13, and to the common assembly comprising the optical waveguide and collar 13 on the surface of the window 5 of the detector encapsulation 1, can be carried out in a single operation. Before the assembly is secured by curing the bonded connection, it is aligned by means of an orientation method so that a maximum amount of available light intensity strikes the light-sensitive face of the converter 4.

The arrangement thus obtained is stabilized by an additional anti-kink protection so that the connection is sufficiently robust to be capable of being handled without damage. Anti-kink protection is obtained by means of the sleeve 10 fitted around the detector casing which projects beyond the edge of the encapsulation 1 and surrounds parts of the optical waveguide coupling. The pot thus formed can be filled with a sealing compound 11 to insure that the capillary-like collar 13 possesses sufficient lateral support. It is advantageous to produce the anti-kink protective sleeve 13 from one piece of shrink-fit hose. After the pot region has been filled (e.g., with a plastic sealing compound), the piece of shrink-fit hose is shrink-fitted closely around the component group by heating.

Assuring that materials are chosen in accordance with their purposes, an optical waveguide connection is achieved in accordance with the invention having excellent resistance to temperature change, moisture, vibration and shock.

While this invention has been described with reference to its presently-preferred embodiment, it is not limited thereto. Rather, this invention is limited only insofar as it is described by the following set of patent claims and includes within its scope all equivalents thereof.

What is claimed is:

1. In a connection between an optical waveguide and an optical receiver of the type that includes an encapsulated light-sensitive converter located behind a translucent window wherein one end of said optical waveguide is secured in front of said window of said encapsulation and permanently connected thereto, the improvement comprising, in combination:

a) an encapsulation-end end element of said optical waveguide being introduced into a capillary-like collar secured to a surface of said window;

b) said end element being bonded in said collar;

c) said collar being surrounded by an anti-kink protective sleeve;

d) said protective sleeve overlapping a window-end edge of said encapsulation; and e) the interior of said protective sleeve being filled with a sealing compound in the region of said optical waveguide connection surrounded by said collar.

2. An optical waveguide connection as defined in claim 1 wherein a sheath is removed from said optical waveguide in the vicinity of said collar.

3. An optical waveguide connection as defined in claim 1 wherein said anti-kink protective sleeve comprises a piece of shrinkable hose secured to said encapsulation in said overlapping region by means of thermal contraction.

4. An optical waveguide connection as defined in claim 1 wherein said optical waveguide comprises quartz glass.

5. An optical waveguide connection as defined in claim 1 wherein said optical waveguide comprises plastic.

6. An optical waveguide connection as defined in claim 1 wherein said capillary-like collar comprises a material whose thermal expansion characteristics are matched to those of said optical waveguide.

7. An optical waveguide connection as defined in claim 1 wherein the bonding of said optical waveguide to said optical receiver encapsulation is achieved with a light-curing bonding agent.

\* \* \* \* \*